(12) United States Patent
Therrien (10) Patent No.: US 8,997,543 B2
(45) Date of Patent: Apr. 7, 2015

(54) CRIMP DIE SET

(71) Applicant: Hubbell Incorporated, Shelton, CT (US)

(72) Inventor: Peter N. Therrien, Bedford, NH (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 14/209,311

(22) Filed: Mar. 13, 2014

(65) Prior Publication Data

US 2014/0260503 A1 Sep. 18, 2014

Related U.S. Application Data

(60) Provisional application No. 61/787,449, filed on Mar. 15, 2013.

(51) Int. Cl.
*B21D 19/00* (2006.01)
*E21B 19/07* (2006.01)
*B21D 37/10* (2006.01)

(52) U.S. Cl.
CPC ....................................... *B21D 37/10* (2013.01)

(58) Field of Classification Search
USPC ........... 81/57.33, 57.15, 186; 72/409.01, 414, 72/416; 175/423
See application file for complete search history.

(56) References Cited

U.S. PATENT DOCUMENTS

| | | | |
|---|---|---|---|
| 3,650,140 A * | 3/1972 | Zmuda | 72/369 |
| 3,654,793 A * | 4/1972 | Ziegler et al. | 72/703 |
| 3,842,957 A * | 10/1974 | Wilkin et al. | 101/11 |
| 3,905,220 A | 9/1975 | Sosinski | |
| 3,956,823 A | 5/1976 | Kuo | |
| 4,126,936 A | 11/1978 | Koller | |
| 4,277,124 A | 7/1981 | Loose et al. | |
| 4,586,610 A * | 5/1986 | Gandolfo | 206/485 |
| 5,084,963 A | 2/1992 | Murray et al. | |
| 5,649,445 A | 7/1997 | Lavoie et al. | |
| 5,778,774 A | 7/1998 | Lavoie | |
| 5,966,982 A | 10/1999 | Mello et al. | |
| 6,079,509 A * | 6/2000 | Bee et al. | 175/423 |
| 6,230,406 B1 | 5/2001 | Balfour et al. | |
| 6,971,283 B2 * | 12/2005 | Belik | 81/57.33 |
| 7,493,791 B2 | 2/2009 | Chadbourne | |
| 7,543,366 B2 * | 6/2009 | Hu | 81/121.1 |
| 7,665,343 B2 * | 2/2010 | Ballas et al. | 72/416 |

(Continued)

FOREIGN PATENT DOCUMENTS

JP 8111247 4/1996

OTHER PUBLICATIONS

International Search Report for Application No. PCT/US2014/026598 dated Jul. 21, 2004 (2 pages).

(Continued)

*Primary Examiner* — David B Jones
(74) *Attorney, Agent, or Firm* — Michael Best & Friedrich LLP (57) ABSTRACT

A die set for crimping operations includes first and second die members having raised areas including a plurality of knurls and character areas. The die set combining knurls and character areas on the operative areas of the die members allows a single die set to be used to condition a surface for crimping operations as well as crimping connectors and marking them with relevant indicia without having to change die sets.

19 Claims, 5 Drawing Sheets

(56) References Cited

U.S. PATENT DOCUMENTS

| | | |
|---|---|---|
| 7,685,859 B2 | 3/2010 | Ukpai et al. |
| 7,722,608 B2 * | 5/2010 | Steiner et al. .................. 606/53 |
| 2008/0022749 A1 | 1/2008 | Chadbourne |
| 2010/0087104 A1 | 4/2010 | Gump et al. |
| 2010/0101379 A1 | 4/2010 | Hofmann et al. |
| 2011/0048096 A1 | 3/2011 | Bradley et al. |
| 2012/0314226 A1 | 12/2012 | Kelly |

OTHER PUBLICATIONS

International Written Opinion for Application No. PCT/US2014/026598 dated Jul. 21, 2004 (4 pages).

* cited by examiner

CRIMP DIE SET

CROSS-REFERENCE TO RELATED APPLICATIONS

The present application claims priority under 35 U.S.C. §119(e) to U.S. Provisional Application No. 61/787,449, filed Mar. 15, 2013, the contents of which are hereby incorporated by reference in their entirety.

FIELD OF THE INVENTION

The present invention relates generally to a crimp die set. More particularly, the present invention relates to a crimp die set having a surface including knurls and characters and methods of using the same. Still more particularly, the present invention relates to a crimp die set that prepares a surface to be crimped and embosses an identification number thereon.

BACKGROUND OF THE INVENTION

Crimping tools using interchangeable accessory dies are known in the art. As will be appreciated by one of ordinary skill in the art, crimp die sets are used in various fields for various purposes. One particularly applicable field involves those environments when crimping is required for grounding metal surfaces. Such environments include grounding steel "I"-beams in construction and steel supports for solar panels in solar farms. Other environments include situations such as grounding steel street grates or steel ladders in sewer manholes, etc. Typically, these environments involve metal substrates having thicknesses of ⅛ inch to ⅞ inch. To these metal substrates, a grounding connector and grounding wire are crimped together. The composite is then adapted to take ground fault energy and the like from the substrate through the connector to the wire and then safely to ground.

For these types of environments, the art has developed particularized crimp die sets and methods. For example, when installing electrical connectors and ground wires to metal substrates, it is particularly imperative that the materials stay connected even under stress or otherwise the ground fault protection is lost. To this end, Underwriter's Laboratories has promulgated the UL467 Standard for grounding connectors that specifies a minimum "pull off" value. As will be appreciated, the pull off value is the amount of stress (pounds) that is required to pull the grounding member off of the metal substrate. By requiring a minimum pull off value be met, UL-approved products can help assure that grounding wires and the like stay attached to the metal substrates through the range of stresses that may be encountered in the environment, thereby maintaining the protection against ground faults.

The art generally recognizes that structural steel and other flat surfaces are often generally smooth in texture. A problem with smooth surfaces is that it is difficult to simply squeeze a connector onto the smooth surface and expect it to remain adhered under even minimal stress. To combat this adhesion problem, the art uses "knurling" dies to condition the surface of the metal substrate. "Knurling" dies are a set of dies that include a field of raised features that will deform the surface(s) of substrate under pressure to leave the surface(s) textured. Typical, the knurls (raised features) are pyramidal in shape. Knurling leaves the surface textured and thus able to form more meaningful and lasting connections when crimped together with other materials. Knurling is carried out using a crimp tool that is loaded with right and left die members (a die set). Once loaded, the crimp tool is positioned such that its jaws accept the connection area of the substrate and then operated to squeeze the metal substrate under force (up to 12 tons) between the die members. The die members in turn displace and deform the metal substrate surface with an imprint of the topography of the die member faces. Dies come in different sizes and shapes and each configuration has its own "die number." The die number is specific to the die set and is a universally recognized classification system for dies.

Notably, the connectors to be crimped to the metal substrates have been tested by UL to meet the pull off value requirement. The die index number for the die set used with the connector in passing the tests that are required for UL approval plays an important role. In order to comply with the standard, the same die number must be used in the field when crimping the connectors to substrates (to assure that the minimum pull off value is achieved).

In connection with complying with the UL standard, the instructions for most electrical connectors identify the die index to be used in crimping the connectors to the metal substrate. An issue arises when an electrical inspector is inspecting a work site and needs a way to identify if the connections are complying with the UL standard by employing the correct die index. Presently, the art has evolved to the use of a second die set having a mirror-image impression of the die index number in the face of the die members. The provision of the die number recesses in the die members allows the crimp tool to be reloaded with the second die set and activated a second time to squeeze the metal, typically copper, connectors such that the second die set members deform the metal to the point that it is accepted into the impressions during crimping, thereby embossing the die number raised and visibly discernible on the connector body after crimping. An inspector can then visually see the die index number and confirm that the correct die set was used in crimping the grounding connector and wire to the metal substrate sufficient to meet the UL standard during his inspection.

As will be appreciated, the current state of the art of crimp tool dies for grounding operations uses two separate die sets to perform the crimping operation. The first die set is used to prepare the surface. The second die set in turn crimps the connector to the surface and embosses a die index number thereon. The process of loading the crimp tool with a first die set to condition the surface of the substrate and engaging the substrate, then removing the tool from the substrate, loading a second die set, repositioning the tool and a connector/wire assembly, and then crimping the connector/wire assembly and substrate together (and leaving a visible die index number on the surface) is time consuming.

Additionally, as will be appreciated, the cost of knurling dies and separate die index dies is expensive as an installer must purchase two crimp die sets for each crimp size, thereby increasing costs and inventory. Not only is additional time required to conduct the crimp operation in switching between the two different crimp die sets, an improper size second die set can accidentally be used, thereby resulting in a poor crimp.

The foregoing highlights some of the problems with conventional crimp die sets. Furthermore, the foregoing highlights the long-felt, yet unresolved need in the art for a crimping method that can be used more quickly and efficiently to meet the requirements for crimping operations in the field. In addition, the foregoing highlights the inventor's recognition of a need in the art for a crimp die set that prepares a crimping surface and embosses an identification number thereon.

SUMMARY OF THE INVENTION

Various embodiments of the present invention overcome various of the aforementioned and other disadvantages associated with prior art crimp die set and methods, and offers new advantages as well.

According to one aspect of various embodiments of the present invention, there is provided a crimp die set that reduces inventory.

According to another aspect of various embodiments of the present invention, there is provided a crimp die set that quickens a crimping operation.

According to yet another aspect of various embodiments of the present invention there is provided a single crimp die set or a pair of dies that both prepares a crimp surface and embosses an identification number thereon.

These aspects and other advantageous features of various embodiments of the present invention may be realized by the provision of what the present inventor terms a "combocrimp" die set. In a preferred embodiment, the combocrimp die set comprises a pair of cooperating die members adapted to fit in and be operable with standard-sized crimp tools.

Preferably, the die members comprise a first die member and a second die member having operative surfaces including knurls. In preferred embodiments, the die members are configured in the same shape and comprises the same materials as prior art die members with the difference being confined to the knurl surface. According to an advantageous feature of this embodiment of the invention, the knurls are disposed in a generally waffle-pattern (similar to that of existing knurl dies) that further includes areas of numbers, symbols, or patterns defined in the knurl area.

Preferably, the areas of numbers, symbols, or patterns comprise raised areas of appropriately shaped knurl peaks suited to emboss the numbers, symbols, or patterns on a substrate, such as an electrical connector and ground wire assembly, crimped between the die members. In a presently preferred embodiment, the peaks of the raised areas are coterminous with the peaks of the knurls. An advantageous feature of the invention is that the raised areas can be included on one, or preferably both, die members. In an alternate embodiment, the raised areas may comprise depressed areas similar to those of prior art crimping dies to emboss die index numbers on connectors.

The invention as described and claimed herein should become evident to a person of ordinary skill in the art given the following enabling description and drawings. The aspects and features of the invention believed to be novel and other elements characteristic of the invention are set forth with particularity in the appended claims. The drawings are for illustration purposes only and are not drawn to scale unless otherwise indicated. The drawings are not intended to limit the scope of the invention. The following enabling disclosure is directed to one of ordinary skill in the art and presupposes that those aspects of the invention within the ability of the ordinarily skilled artisan are understood and appreciated.

As used in this application, the terms "front," "rear," "upper," "lower," "upwardly," "downwardly," and other orientational descriptors are intended to facilitate the description of the exemplary embodiment of the present invention, and are not intended to limit the structure of the exemplary embodiment of the present invention to any particular position or orientation.

BRIEF DESCRIPTION OF THE DRAWINGS

Various aspects and advantageous features of embodiments of the present invention will become more apparent to those of ordinary skill when described in the detailed description of a preferred embodiment and reference to the accompany drawing wherein.

Throughout the drawings, like reference numerals will be understood to refer to like parts, components and structures.

DETAILED DESCRIPTION

While the present invention will be described in connection with embodiments suited for the operation of crimping copper electrical connectors and wires to steel substrates using a hand-operated, hydraulic crimp tool, it will be readily apparent to one of ordinary skill in the art armed with the present specification that the present invention can be modified and applied to any suitable crimping operating or the like in any suitable environment.

Figure 1:
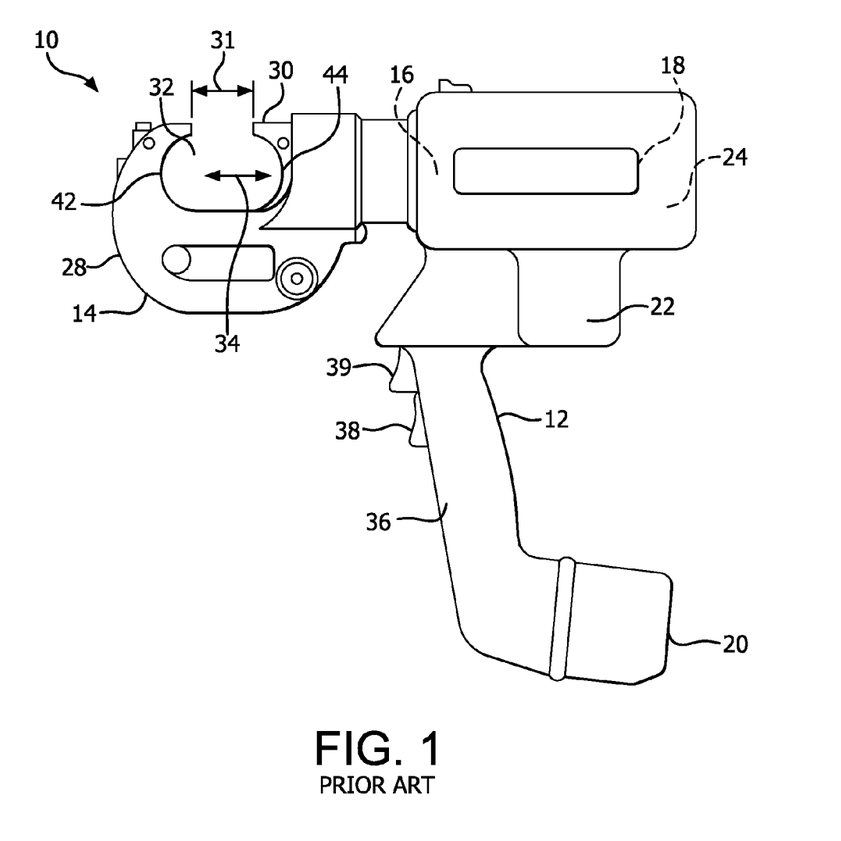
FIG. 1 is a side elevational plan view of a conventional crimp tool.
Figure 2:
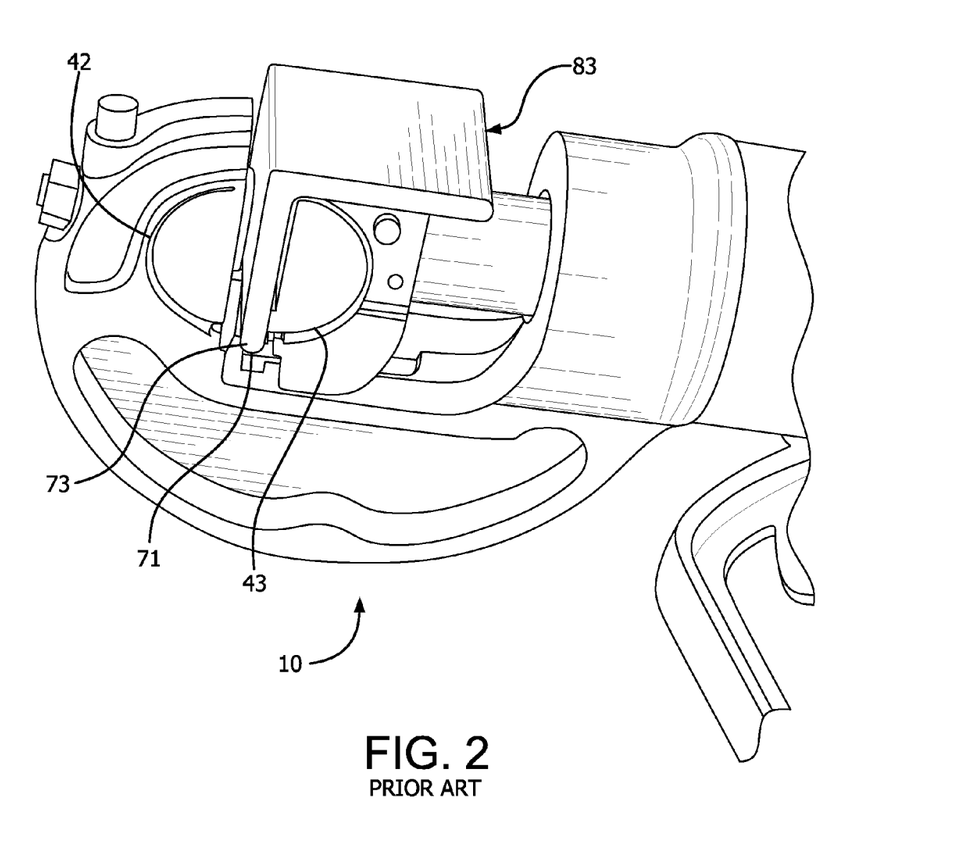
FIG. 2 is a perspective view of a first die set, or knurling die set, used with the crimp tool of FIG. 1 to prepare a surface for crimping.
Figure 3:
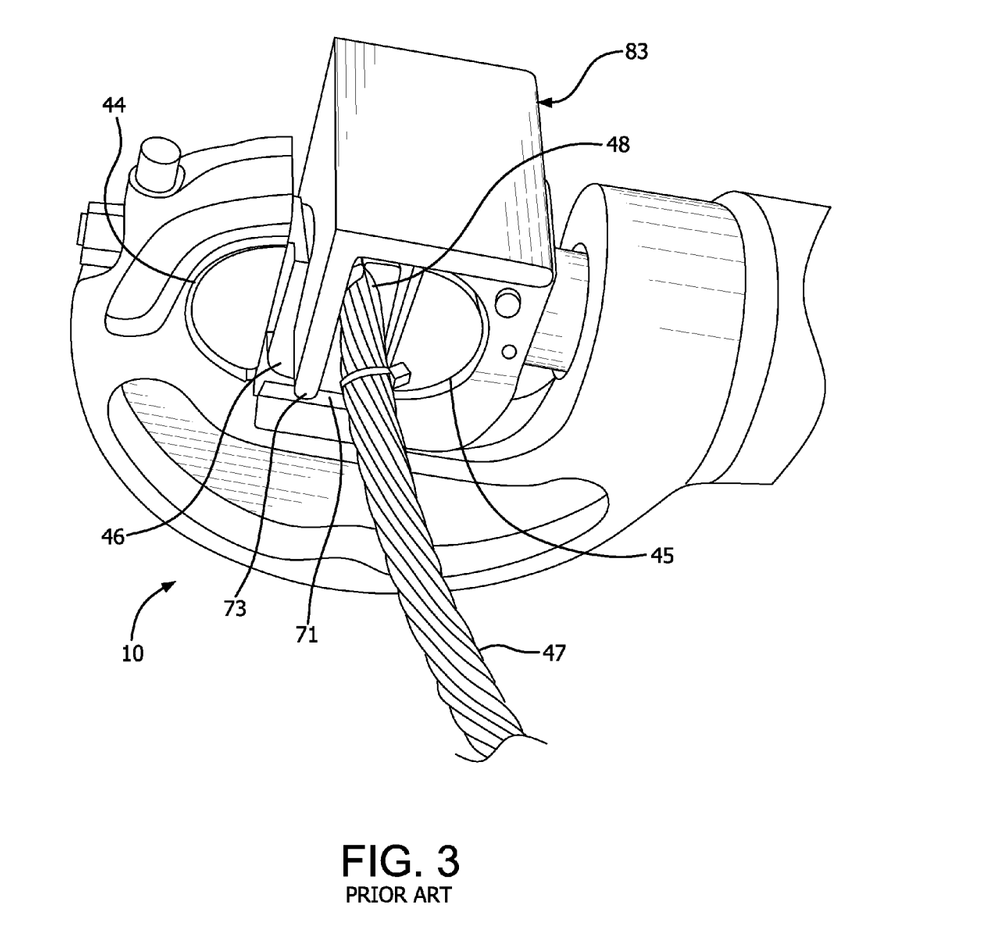
FIG. 3 is a perspective view of a second die set used with the crimp tool of FIG. 1 to crimp a connector to the prepared surface and emboss the die index number thereon.

For context, a crimp tool and crimping dies commonly used in installing electrical connectors is depicted in FIGS. 1-3. As shown in FIG. 1, a conventional crimping tool 10 includes a frame 12, a working head 14, a pump 16, a motor 18, a battery 20, a fluid reservoir 22 and a controller 24. The tool can also include additional or alternative components. The frame 12 forms a ram hydraulic drive conduit system. The working head 14 comprises a frame section 28 and a ram 30. The frame section 28 is stationarily connected to the front end of the frame 12, but could be rotatable. The ram 30 is movably connected to the section 28. The section 28 and the ram 30 are adapted to removably receive conductor knurling and crimping dies at a conductor receiving area 32.

The ram 30 moves forward and backward axially as indicated by arrow 34. The ram hydraulic drive conduit system is connected between the pump 16 and the rear end of the ram 30. Hydraulic fluid pumped by the pump 16 against the rear end of the ram 30 causes the ram 30 to move forward. A spring (not shown) returns the ram 30 to its rearward home position when hydraulic fluid pressure is released. The ram 30 moves a distance 31 between its rear position and its forward position.

The frame 12 forms a handle 36. The battery 20 is removably connected to the bottom of the handle 36. The handle 36 includes two user actuatable control triggers 38 and 39, which are operably coupled to the controller 24.

The motor 18 is coupled to the controller 24 and the battery 20. The motor 18 is controlled by the controller 24. The output shaft of the motor 18 is connected to the pump 16 by a gear reduction or gearbox.

When crimping an electrical wire crimp connector to a surface, a two step process is required. First, the surface 41, such as a steel or solid surface area, is disposed between a first die set 42 and 43, known as "knurling dies", as shown in FIG. 2. The first die set 42 and 43 has knurls to prepare the surface 41 for the subsequent crimp connection.

As shown in FIG. 3, the first die set 42 and 43 is removed and replaced with a second die set 44 and 45, or "crimping dies." The prepared surface 41 is disposed in a crimp connector 46 such that both surfaces of the prepared surface 41 engage a surface of the crimp connector 46. An electrical wire 47 is disposed in an opening 48 in the crimp connector 46. The surface 41, the crimp connector 46 and the electrical wire 47 are crimped together using the second die set 44 and 45. The second die set 44 and 45 include recesses in the form of the die index number for the die set. The recesses serve to emboss the die index number on the crimp connector 46 to ensure proper tooling was used in the operation as required by UL.

As clear from the above, the accepted method of crimping grounding connectors and the like in the field is a multi-step process. In particular, the need to change die sets in mid-operation to ultimately emboss the die index number on the connector is particular time-consuming, and apt to lead to mistakes wherein an improper size second die set is accidentally be used, thereby resulting in a poor, non-compliant crimp.

The present inventor recognized a need in the art for an improved process for crimping. A crimp die set, referred to as the "combocrimp" die set, in accordance with an exemplary embodiment of the present invention is shown in FIGS. 4-7. Although the present invention will be described with reference to the exemplary embodiment shown in FIGS. 4-7, it should be understood that the present invention can be embodied in alternative embodiments. For example, any suitable size and shape for the dies can be used. One of ordinary skill in the art armed with the present specification can modify the configuration of the die members to suit them for their intended purpose.

Returning to the Figures, the combocrimp die set comprises first and second die members 51 and 52 that are adapted to be removably mounted to the frame section 28 and the ram 30 at opposing locations 42 and 44 of the conventional crimp tool 10 depicted in FIG. 1. The two locations 42 and 44 form die mounting areas of the crimp tool 10 for removably mounting the dies 51 and 52 to the crimp tool. The dies 51 and 52 can be mounted to any suitable type of tool such as, but not limited to, a non-battery operated tool or a non-hydraulic tool. The first and second dies 51 and 52 are each preferably unitarily formed as a single piece and are made of steel as with prior art die members. However, any suitable material or fabrication method may be used, and such variations are well within the ability of one of ordinary skill in the art.

Figure 4:
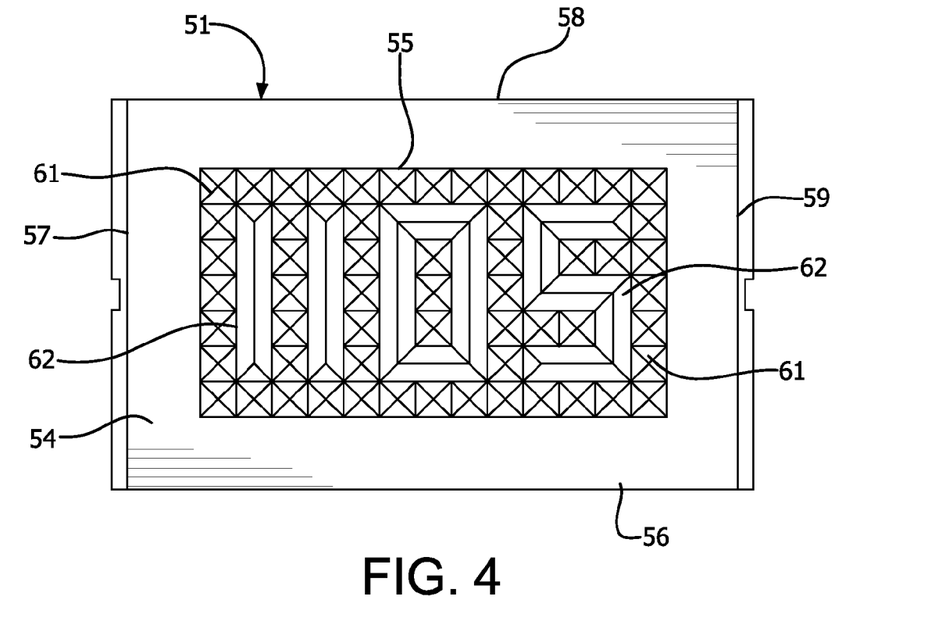
FIG. 4 is a top plan view of a first die of a combocrimp die set in accordance with an exemplary embodiment of the present invention.
Figure 5:
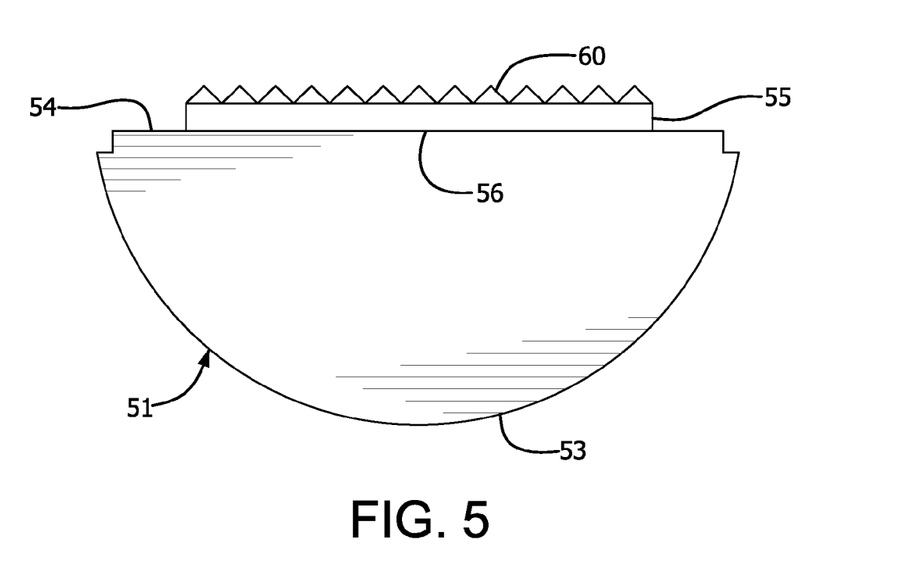
FIG. 5 is a side elevational view of the first die of FIG. 4.

The first die 51 of the combocrimp die set is shown in FIGS. 4 and 5 and has a substantially semi-cylindrical shape. A rounded surface 53 of the first die 51 is received at location 42 of the crimp tool 10 of FIG. 1. A planar surface 54 of the first die 51 has a raised platform 55, which is spaced inwardly from edges 56-59 of the first die 51.

The raised platform 55 includes a plurality of knurls 60 and reference character areas 61. The knurls 60 are preferably substantially pyramid shaped, although any suitable shape can be used. As shown in FIG. 4, the reference character 61 is "1105." The reference character preferably corresponds to a recommended die index number for the crimp connector.

As depicted, the reference character area 61 comprises raised ridges in the pattern of the reference character "1105." With this configuration, the raised ridges serve to condition the surface as well as stamp the surface with the character. In alternate embodiments, the character areas 61 may comprises recesses defined by knurls (or the absence thereof). For example, knurls may surround the areas thereby defining a character. Alternatively, the raised platform 55 may include an etched area defining the character for embossing the character on a substrate.

Figure 6:
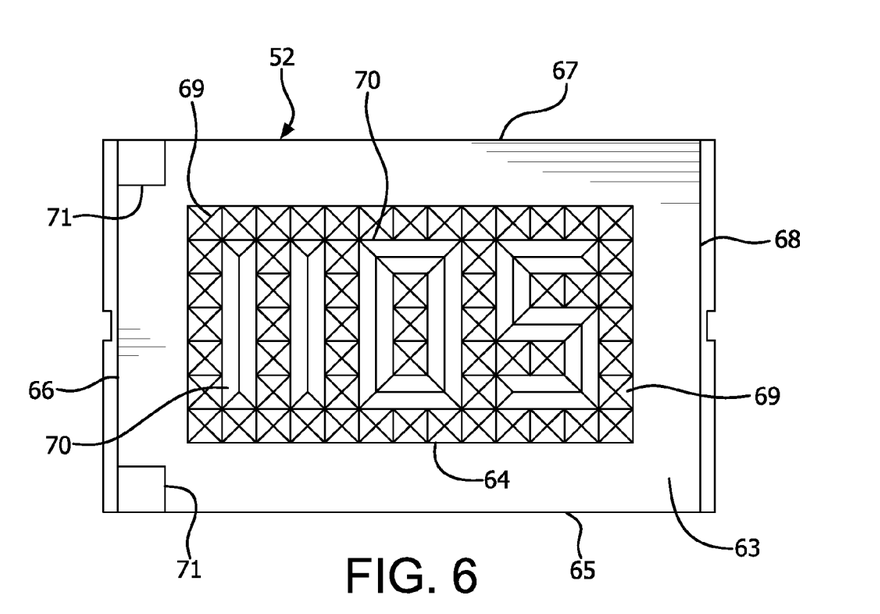
FIG. 6 is a top plan view of a second die of the combocrimp die set in accordance with an exemplary embodiment of the present invention.
Figure 7:
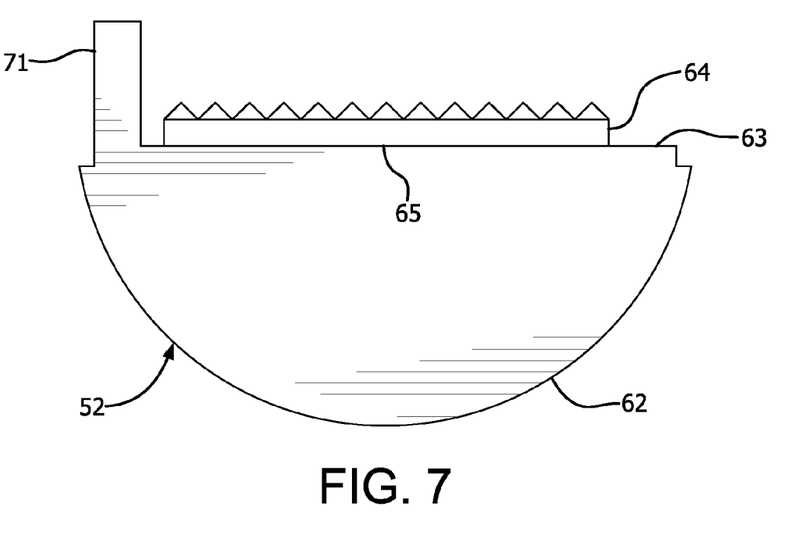
FIG. 7 is a side elevational view of the second die of FIG. 6.

The second die 52 of the crimp die set is shown in FIGS. 6 and 7 and has a substantially semi-cylindrical shape. A rounded surface 62 of the second die 52 is received at location 44 of the crimp tool 10 of FIG. 1. A planar surface 63 of the second die 52 has a raised platform 64, which is spaced inwardly from edges 65-68 of the second die 52.

Similar to the first die member, the raised platform 64 of the second die member preferably includes a plurality of knurls 69 and reference character areas 70. The knurls 69 are preferably substantially pyramid shaped, although any suitable shape can be used. As shown in FIG. 6, the reference character 70 is "1105." As depicted, the reference character area comprises raised ridges in the pattern of the reference character. With this configuration, the raised ridges serve to condition the surface as well as stamp the surface with the character. In alternate embodiments, the character areas 70 may comprises recesses defined by knurls (or the absence thereof). For example, knurls may surround the areas thereby defining a character. Alternatively, the raised platform 64 may include an etched area defining the character for embossing the character on a substrate. The reference character preferably corresponds to a recommended die index number for the crimp connector and corresponds to the reference character of the first die 51.

A pair of posts 71 extend upwardly from the planar surface 63 of the second die 52 at opposite ends of the second edge 66. The posts 71 are engaged by an edge 73 of the surface 41 to facilitate proper alignment of the surface 41, as shown in FIG. 2. As shown in FIGS. 2 and 3, the surface 41 is one leg of a substantially L-shaped bracket 83.

To crimp the connector 46 to the surface 41 of the bracket 83, the first and second dies 51 and 52 are connected to the crimp tool 10 in any suitable manner. The surface 41 is then disposed between the first and second dies 51 and 52, and the crimp tool 10 is operated, as shown in FIG. 2, for the surface preparing step. The knurls 61 and 69 displace material on opposite surfaces of the surface 41 to prepare the surface for the crimping step. The reference characters 62 and 70 of the first and second dies 51 and 52 further displace material on the surface 41.

The prepared surface 41 is then disposed in a crimp connector 46 to which an electrical wire 47 is loosely connected, as shown in FIG. 3, for the crimping step. The first and second die sets 51 and 52 remain in the tool 10 for the crimping procedure. The knurled areas of the surface 41 facilitate having the crimp connector 46 crimped thereto. Operating the crimp tool 10 crimps and secures the connector 46 and electrical wire 47 and crimps and secures the connector 46 and the surface 41 of the substantially L-shaped bracket 83. The entire raised platforms 55 and 64 of the first and second dies 51 and 52 act as the crimping surface during the crimping step. The reference characters 62 and 70 of the first and second dies 51 and 52 emboss the reference characters onto surfaces of the crimp connector 46. Preferably, the reference characters 62 and 70 correspond to a recommended die index number displayed on the crimp connector 46. Accordingly, during an inspection, it can be quickly and easily determined whether the appropriate die set was used by comparing the embossed characters crimped onto the connector with the recommended die index number displayed thereon.

In accordance with an exemplary embodiment of the present invention, the same die set can be used to prepare the surface for crimping and for crimping the connector to the prepared surface. The inventory of required crimp die sets is reduced, and the ease and speed with which the crimping operation can be performed is increased.

While advantageous embodiments have been chosen to illustrate the invention, it will be understood by those skilled in the art that various changes and modifications may be made therein without departing from the scope of the invention. The above embodiments are for illustrative purposes and are not intended to limit the scope of the invention or the adaptation of the features described herein to particular tools. Those skilled in the art will also appreciate that various adaptations and modifications of the above-described preferred embodiments can be configured without departing from the scope and spirit of the invention. Therefore, it is to be understood that, within the scope of the appended claims, the invention may be practiced other than as specifically described.

I claim:

1. A die set for crimping operations comprising:
a first die member comprising a die body having an operative surface;
said operative surface having a plurality of knurl members and character areas defining a reference character between said knurl members.

2. The die set of claim 1, wherein said character areas comprise a ridge.

3. The die set of claim 2, wherein said knurl members and said ridge have the same height.

4. The die set of claim 1, further comprising a second die member having an operative surface and a plurality of knurl members disposed on said operative surface, wherein said knurl members of said second die member include character ridges defining a reference character.

5. The die set of claim 4, wherein said reference characters of said first and second die members define the same reference character.

6. The die set of claim 4, wherein said reference characters of said first and second die members comprise a die index number.

7. The die set of claim 1, further comprising
a second die member;
each of said first and second die members having a substantially semi-cylindrical body including a rounded side and a flat side;
said rounded side configured to be operatively engaged in a crimp tool; and,
said flat side including a raised platform defining said operative surface and including said knurl members and character areas.

8. The die set of claim 7, wherein said die set is received in a crimp tool and operative to condition a surface for crimping and for crimping a connector to said conditioned surface while also embossing a die index number on said connector.

9. The die set of claim 8, wherein said knurl members are generally pyramid shaped.

10. The die set of claim 1, wherein said character areas are recesses defined by said knurl members surrounding said character areas.

11. The die set of claim 1, wherein said character areas are recesses in said operative surface.

12. The die set of claim 2, wherein
said ridge of said character area has a length greater than a length of said knurl members.

13. The die set of claim 2, wherein
said ridge of said character area has a width greater than a width of said knurl members.

14. The die set of claim 2, wherein
said at least one reference character of said first and second die members comprises a plurality of characters.

15. The die set of claim 14, wherein
said plurality of characters is a die index number.

16. A method of crimping workpieces together comprising:
loading a crimp tool having opposing jaws with die members including opposing operative surface having a plurality of knurl members and character areas;
positioning a portion of a substrate between the jaws of the crimp tool and between the operative surfaces of the die members;
actuating the crimp tool to close the jaws and engage the operative surfaces of said die members to condition a surface of said substrate;
opening the jaws and inserting a connector body and wire member into engagement with said substrate;
actuating the crimp tool a second time to crimp the connector body and wire member to said substrate, whereby said crimping leaves a mirror-image of said character areas on said connector body.

17. A kit for crimping operations comprising:
a plurality of die sets each said die sets being sized to a die index value and configured to include said index value on an operative area of at least one of said die set members, whereby use of said die sets results in the index value of said die sets being left on a workpiece, each said die set having a first die member and a second die member, said first die member having an operative surface with a character area corresponding to the die index value.

18. The kit of claim 17, wherein
said operative surface of said first die members include knurl members defining said character area between said knurl members.

19. The kit of claim 18, wherein
said second die member has an operative surface with a plurality of knurl members defining a character area on said second die member between said knurl members on said second die member.

* * * * *